(12) United States Patent
Tsuchida et al.

(10) Patent No.: US 12,489,140 B2
(45) Date of Patent: Dec. 2, 2025

(54) ALL-SOLID-STATE BATTERY AND METHOD FOR MANUFACTURING THE SAME

(71) Applicant: Panasonic Intellectual Property Management Co., Ltd., Osaka (JP)

(72) Inventors: Shuzo Tsuchida, Nara (JP); Ami Okabe, Osaka (JP); Yoshiro Kitamura, Osaka (JP); Akihiro Horikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 744 days.

(21) Appl. No.: 17/719,436

(22) Filed: Apr. 13, 2022

(65) Prior Publication Data

US 2022/0344705 A1 Oct. 27, 2022

(30) Foreign Application Priority Data

Apr. 26, 2021 (JP) .................................. 2021-074424

(51) Int. Cl.
*H01M 10/0562* (2010.01)
*H01M 10/0585* (2010.01)

(52) U.S. Cl.
CPC ... *H01M 10/0562* (2013.01); *H01M 10/0585* (2013.01); *H01M 2300/0065* (2013.01); *H01M 2300/0094* (2013.01)

(58) Field of Classification Search
CPC ...................... H01M 10/0562; H01M 10/0585
See application file for complete search history.

(56) References Cited

U.S. PATENT DOCUMENTS

| | | | |
|---|---|---|---|
| 2016/0248120 A1 | 8/2016 | Yamada et al. | |
| 2018/0226652 A1* | 8/2018 | Mori | H01M 4/668 |
| 2018/0226681 A1 | 8/2018 | Hasegawa et al. | |
| 2019/0305368 A1 | 10/2019 | Mizutani et al. | |
| 2020/0083562 A1 | 3/2020 | Kim et al. | |

FOREIGN PATENT DOCUMENTS

| | | |
|---|---|---|
| JP | 2014-086174 | 5/2014 |
| JP | 2016-152204 | 8/2016 |
| JP | 2018-125260 | 8/2018 |
| JP | 2018-129222 | 8/2018 |
| JP | 2019-185897 | 10/2019 |
| KR | 10-2020-0028165 | 3/2020 |

* cited by examiner

*Primary Examiner* — Karie O'Neill Apicella
(74) *Attorney, Agent, or Firm* — Wenderoth, Lind & Ponack, L.L.P.

(57) ABSTRACT

An all-solid-state battery has a structure in which a positive electrode current collector, a positive electrode layer containing a positive electrode active material and a solid electrolyte, a solid electrolyte layer containing a solid electrolyte, a negative electrode layer containing a negative electrode active material and a solid electrolyte, and a negative electrode current collector are stacked in this order. The solid electrolyte layer has a repeating structure in which a low porosity portion and a high porosity portion having a higher porosity than a porosity of the low porosity portion are repeated in an in-plane direction.

11 Claims, 9 Drawing Sheets

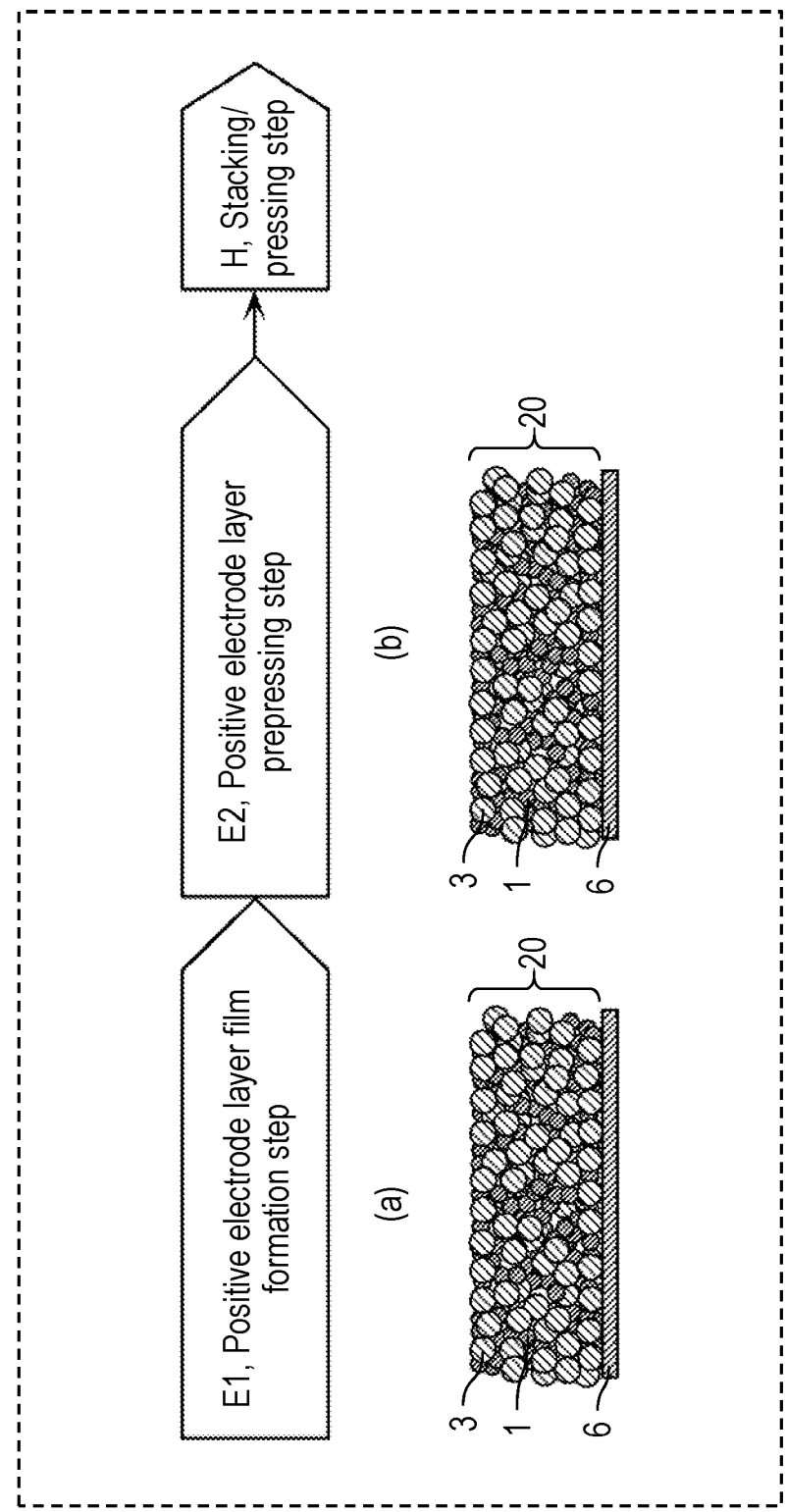

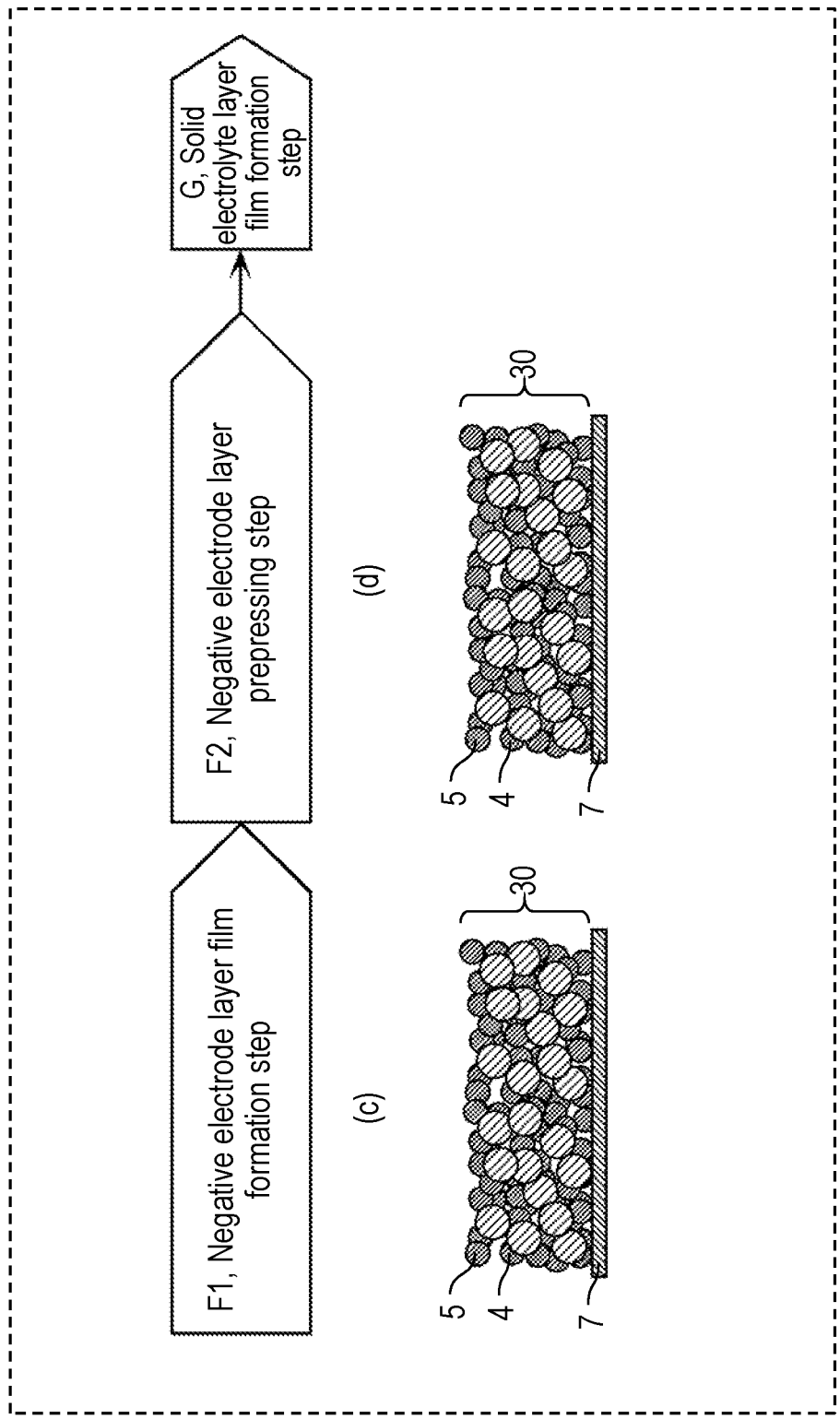

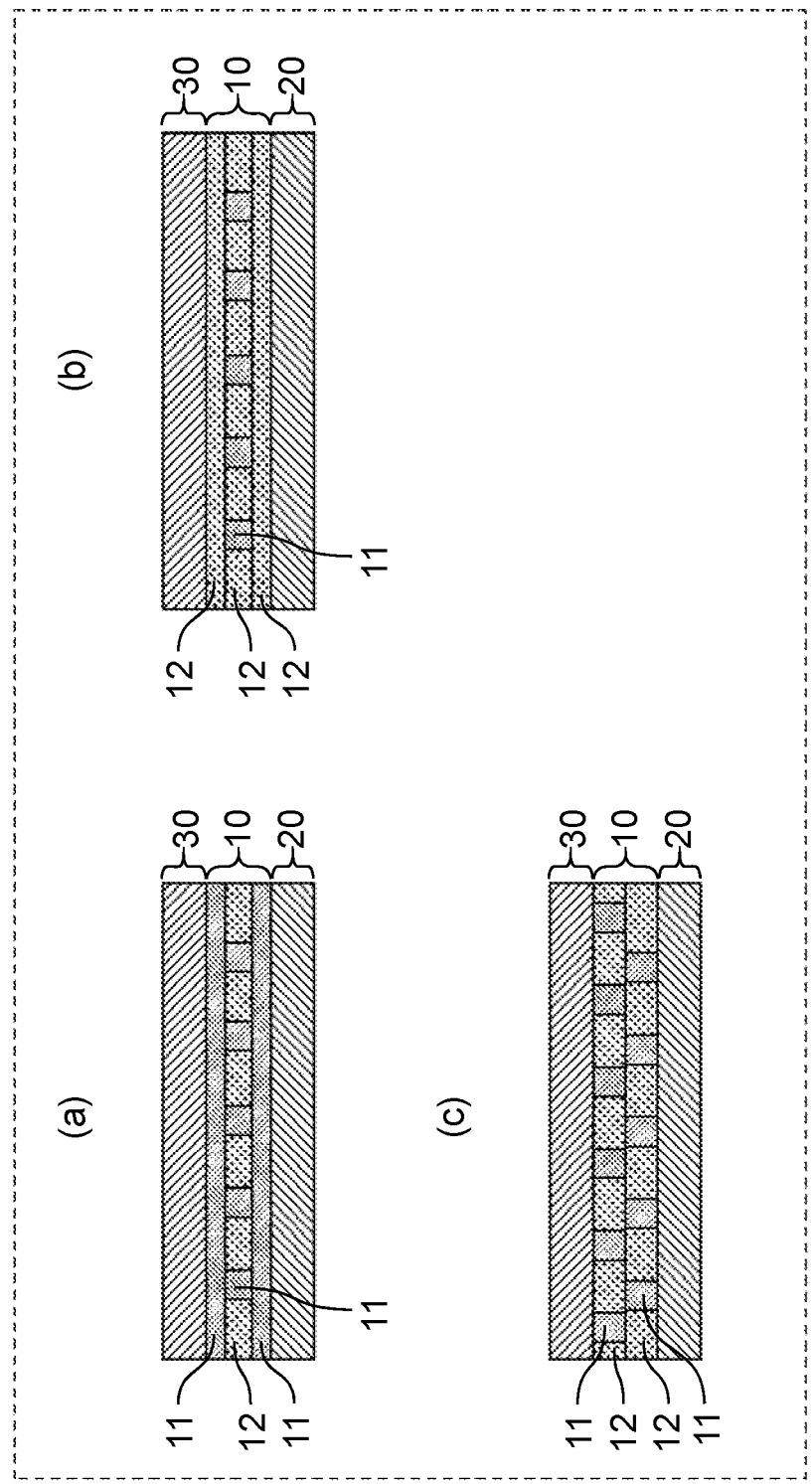

ALL-SOLID-STATE BATTERY AND METHOD FOR MANUFACTURING THE SAME

BACKGROUND

1. Technical Field

The present disclosure relates to an all-solid-state battery and a method for manufacturing the same, and more particularly to an all-solid-state battery using a positive electrode layer, a negative electrode layer, and a solid electrolyte layer, and a method for manufacturing the same.

2. Description of the Related Art

In recent years, there has been a demand for the development of secondary batteries that can be used repeatedly as electronic devices such as personal computers and mobile phones become light weighted and cordless. Examples of the secondary battery include a nickel-cadmium battery, a nickel-hydrogen battery, a lead-acid battery, and a lithium-ion battery. Among these batteries, lithium-ion batteries are attracting attention because of the features such as light weight, high voltage, and high energy density.

In the field of automobiles such as electric vehicles and hybrid vehicles, the development of secondary batteries with high battery capacity is also emphasized, and the demand for lithium-ion batteries is on the rise.

The lithium-ion battery includes a positive electrode layer, a negative electrode layer, and an electrolyte disposed therebetween. As the electrolyte, an electrolytic solution or a solid electrolyte in which a supporting salt such as lithium hexafluorophosphate is dissolved in an organic solvent is used. Currently, widely used lithium-ion batteries are flammable because an electrolytic solution containing an organic solvent is used. Therefore, materials, structures and systems are needed to ensure the safety of lithium-ion batteries. On the other hand, by using a nonflammable solid electrolyte as an electrolyte, it is expected that the material, structure and system of the lithium-ion battery can be simplified, and it is considered that the energy density can be increased, the manufacturing cost can be reduced, and the productivity can be improved. Hereinafter, a battery such as a lithium-ion battery using a solid electrolyte will be referred to as an "all-solid-state battery".

Solid electrolytes can be broadly divided into organic solid electrolytes and inorganic solid electrolytes. The ionic conductivity of the organic solid electrolyte is about $10^{-6}$ S/cm at 25° C., which is extremely low as compared with the ionic conductivity of the electrolytic solution of about $10^{-3}$ S/cm. Therefore, it is difficult to operate an all-solid-state battery using an organic solid electrolyte in an environment of 25° C. As the inorganic solid electrolyte, an oxide-based solid electrolyte, a sulfide-based solid electrolyte, and a halide-based solid electrolyte are generally used. The ionic conductivity of these electrolytes is about $10^{-4}$ to $10^{-3}$ S/cm, which is relatively high. Therefore, in recent years, research and development of all-solid-state batteries for increasing the size and capacity using these electrolytes have been actively conducted.

For example, Japanese Patent Unexamined Publication No. 2014-86174 discloses the configuration of a solid electrolyte layer in an all-solid-state battery in which a positive electrode layer, a solid electrolyte layer, and a negative electrode layer are stacked in this order. Japanese Patent Unexamined Publication No. 2014-86174 discloses a configuration in which peeling and cracking occurred by expansion and contraction of a positive electrode layer and a negative electrode layer in a battery charge/discharge process are prevented from propagating by forming through holes in the solid electrolyte layer to prevent a decrease in battery capacity.

SUMMARY

An all-solid-state battery according to one aspect of the present disclosure has a structure in which a positive electrode current collector, a positive electrode layer containing a positive electrode active material and a first solid electrolyte, a solid electrolyte layer containing a third solid electrolyte, a negative electrode layer containing a negative electrode active material and a second solid electrolyte, and a negative electrode current collector are stacked in this order, and the solid electrolyte layer has a repeating structure in which a low porosity portion and a high porosity portion having a higher porosity than a porosity of the low porosity portion are repeated in an in-plane direction.

BRIEF DESCRIPTION OF THE DRAWINGS

FIG. 2A is a schematic cross-sectional view for describing a step of forming a positive electrode layer in the exemplary embodiment;

FIG. 2B is a schematic cross-sectional view for describing a step of forming a negative electrode layer in the exemplary embodiment;

FIG. 7 is a schematic view showing an example of disposition of the low porosity portion and the high porosity portion in a cross-sectional view of the solid electrolyte layer in the exemplary embodiment.

DETAILED DESCRIPTIONS

Figure 1:
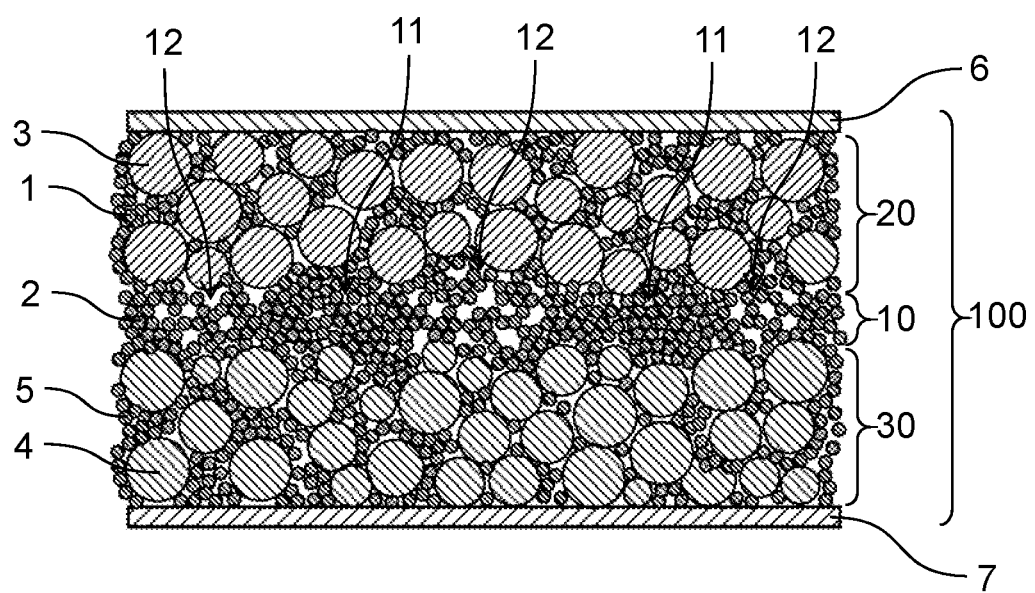
FIG. 1 is a schematic view showing a cross section of an all-solid-state battery according to an exemplary embodiment.

Generally, in the charge/discharge process of an all-solid-state battery, since a positive electrode active material existing in a positive electrode layer and/or a negative electrode active material existing in a negative electrode layer expands and contracts due to repeated charge/discharge, peeling and cracking are likely to occur at the interface between the positive electrode layer and the solid electrolyte layer and/or at the interface between the negative electrode layer and the solid electrolyte layer. By repeating charge/discharge, the occurred peeling and cracking propagate and expand, and the battery capacity decreases.

As a measure for preventing the propagation of such peeling and cracking, for example, the configuration shown in Japanese Patent Unexamined Publication No. 2014-86174 can be mentioned. The all-solid-state battery disclosed in Japanese Patent Unexamined Publication No. 2014-86174 has a structure in which the solid electrolyte layer formed between the positive electrode layer and the negative electrode layer has through holes, and the through hole makes it difficult to propagate peeling and cracking. However, in the vicinity of the through holes, rapid expansion and contraction and heat generation of the positive electrode active material and/or the negative electrode active material due to local current concentration may occur, and the number of portions where peeling and cracking may occur may increase. In particular, the higher the charge/discharge capacity and the charge/discharge speed, the more likely the above problem to occur.

Therefore, the present disclosure provides an all-solid-state battery or the like capable of suppressing the occurrence of peeling and cracking, and the propagation of the occurred peeling and cracking.

Summary of Disclosure

The outline of one aspect of the present disclosure is as follows.

An all-solid-state battery in one aspect of the present disclosure has a structure in which a positive electrode current collector, a positive electrode layer containing a positive electrode active material and a first solid electrolyte, a solid electrolyte layer containing a third solid electrolyte, a negative electrode layer containing a negative electrode active material and a second solid electrolyte, and a negative electrode current collector are stacked in this order, and the solid electrolyte layer has a repeating structure in which a low porosity portion and a high porosity portion having a higher porosity than a porosity of the low porosity portion are repeated in a in-plane direction.

As a result, since the low porosity portion that repeatedly exists in the in-plane direction in the solid electrolyte layer ensures the mobility of ions during charge/discharge even in the high porosity portion, and suppresses local current concentration, peeling of each layer and occurrence of cracking are suppressed. At the interface between the positive electrode layer side and/or the negative electrode layer side of the solid electrolyte layer, stress may occur due to expansion and contraction of the positive electrode active material in the positive electrode layer and/or the negative electrode active material in the negative electrode layer. This stress can be relaxed by the high porosity portion in the solid electrolyte layer, and even when peeling and cracking occur, the propagation of the occurred peeling and cracking can be suppressed.

For example, the difference between the porosity of the high porosity portion and the porosity of the low porosity portion may be 5% or more and 40% or less.

As a result, the battery performance of the all-solid-state battery is not easily impaired, and occurrence of the above-mentioned peeling and cracking and the propagation of the occurred peeling and cracking can be effectively suppressed.

For example, the low porosity portion may be disposed in a line shape or a dot shape in a top view.

This simplifies the device for forming the low porosity portion.

For example, in the repeating structure, the ratio of the low porosity portion and the high porosity portion may be different between the outer peripheral portion and the central portion of the solid electrolyte layer in the top view.

In this way, it is possible to adjust the balance between stress relaxation due to expansion and contraction of the active material and ionic conductivity of the solid electrolyte layer according to the characteristics, shape of the all-solid-state battery, and the like.

For example, at least one of the surface of the solid electrolyte layer on the positive electrode layer side and the surface of the solid electrolyte layer on the negative electrode layer side may have an uneven shape.

As a result, the contact area between the solid electrolyte layer and the layer in contact with the surface of the solid electrolyte layer is increased, the battery performance is improved, and the occurrence of peeling can be further suppressed.

For example, in the uneven shape, a convex portion may be formed by the low porosity portion.

As a result, since the porosity of the convex portion is low, the uneven shape can be easily maintained even when stress is applied during the manufacturing step of the all-solid-state battery and during use.

For example, the solid electrolyte layer may have a portion having a higher porosity than the porosity of the low porosity portion, which is aligned with the low porosity portion along the thickness direction and is in contact with the positive electrode layer or the negative electrode layer.

Thereby, the solid electrolyte layer can effectively relax the stress due to the expansion and contraction of the active material at the interface on the positive electrode layer side or the negative electrode layer side of the solid electrolyte layer.

For example, the solid electrolyte layer may have a portion having a lower porosity than the porosity of the high porosity portion, which is aligned with the high porosity portion along the thickness direction and is in contact with the positive electrode layer or the negative electrode layer.

As a result, the ionic conductivity of the solid electrolyte layer in the vicinity of the positive electrode layer and the negative electrode layer is enhanced, and local current concentration is less likely to occur.

A method for manufacturing an all-solid-state battery according to one aspect of the present disclosure is a method for manufacturing an all-solid-state batter, including a solid electrolyte powder film formation step of laying the third solid electrolyte composed of a plurality of particles in a film shape to form a powder film, a solid electrolyte prepressing step of pressing the powder film to form a prepressed powder film, and a solid electrolyte laser light irradiation step of forming a laser light sintered film in which particles of the third solid electrolyte are partially sintered by irradiating the prepressed powder film with laser light.

As a result, by partially promoting the sintering of the particles of the third solid electrolyte with each other by the irradiation of laser light and reducing the space between the particles of the third solid electrolyte, it is possible to easily manufacture a solid electrolyte layer having a repeating structure in which a low porosity portion and a high porosity portion are repeated in the in-plane direction. It is not necessary to partially replace the materials to form a repeating structure, and the all-solid-state battery can be manufactured by easily changing the disposition of the low porosity portion and the high porosity portion according to the battery specifications such as the size of the all-solid-state battery and the charge/discharge conditions.

For example, the manufacturing method may further include a solid electrolyte pressing step of pressing the laser light sintered film.

In this way, it is possible to improve the ionic conductivity of the solid electrolyte layer.

Hereinafter, the all-solid-state battery in the exemplary embodiment will be described in detail. All of the exemplary embodiments described below illustrate comprehensive or specific examples. The numerical values, shapes, materials, components, disposition positions and coupling forms of the components, steps, and the like shown in the following exemplary embodiments are examples, and are not intended to limit the present disclosure.

In the present specification, terms indicating relationships between elements such as parallel, terms indicating the shape of elements such as rectangles, and numerical ranges are not expressions that express only strict meanings, but are expressions meaning that a substantially equivalent range, for example, a difference of about several percent is included.

Each figure is a schematic view in which emphasis, omission, or ratio adjustment is appropriately performed to show the present disclosure, and is not necessarily exactly illustrated and may differ from the actual shape, positional relationship, and ratio. In each drawing, substantially the same configuration is designated by the same reference numerals, and duplicate description may be omitted or simplified.

In the present specification, the terms "upper" and "lower" in the all-solid-state battery configuration do not refer to the upward direction (vertically upward) and the downward direction (vertically downward) in absolute spatial recognition, but are used as terms defined by the relative positional relationship based on the stacked order in the stacking configuration. The terms "top" and "bottom" apply not only when two components are disposed in close contact with each other and the two components are in contact with each other, but also apply when two components are disposed with a space apart from each other and another component exists between the two components.

In the present specification, the cross-sectional view is a view showing a cross section when the central portion of the all-solid-state battery is cut in the stacking direction, that is, in the thickness direction of each layer.

Exemplary Embodiment

Configuration
A. All-Solid-State Battery

The outline of an all-solid-state battery in the present exemplary embodiment will be described with reference to FIG. 1. FIG. 1 is a schematic view showing a cross section of all-solid-state battery 100 in the present exemplary embodiment. All-solid-state battery 100 in the present exemplary embodiment includes positive electrode current collector 6, negative electrode current collector 7, positive electrode layer 20, negative electrode layer 30, and solid electrolyte layer 10. Positive electrode layer 20 is formed on a surface of positive electrode current collector 6 close to negative electrode current collector 7, and contains positive electrode active material 3 and solid electrolyte 1. Negative electrode layer 30 is formed on a surface of negative electrode current collector 7 close to positive electrode current collector 6, and contains negative electrode active material 4 and solid electrolyte 5. Solid electrolyte layer 10 is disposed between positive electrode layer 20 and negative electrode layer 30, and contains solid electrolyte 2 having at least ionic conductivity. In other words, all-solid-state battery 100 has a structure in which positive electrode current collector 6, positive electrode layer 20, solid electrolyte layer 10, negative electrode layer 30, and negative electrode current collector 7 are stacked in this order. Solid electrolyte layer 10 is in contact with, for example, positive electrode layer 20 and negative electrode layer 30. Solid electrolyte layer 10 has a repeating structure in which low porosity portion 11 and high porosity portion 12 having a higher porosity than low porosity portion 11 are repeated in the in-plane direction. In other words, the in-plane direction is a direction orthogonal to the thickness direction of solid electrolyte layer 10. In the repeating structure, low porosity portion 11 and high porosity portion 12 are repeatedly disposed in at least one predetermined direction in the direction orthogonal to the thickness direction of solid electrolyte layer 10.

In the present exemplary embodiment, solid electrolyte 1 is an example of a first solid electrolyte, solid electrolyte 5 is an example of a second solid electrolyte, and solid electrolyte 2 is an example of a third solid electrolyte.

All-solid-state battery 100 is formed, for example, by the following method. First, positive electrode layer 20 containing positive electrode active material 3 formed on positive electrode current collector 6 made of a metal foil, negative electrode layer 30 containing negative electrode active material 4 formed on negative electrode current collector 7 made of a metal foil, and solid electrolyte layer 10 containing ion-conducting solid electrolyte 2 disposed between positive electrode layer 20 and negative electrode layer 30 are formed. Pressing is performed from the outside of positive electrode current collector 6 and negative electrode current collector 7 at a pressure of, for example, 100 Mpa or more and 1000 Mpa or less, and all-solid-state battery 100 can be obtained by setting the filling rate of at least one layer of each layer to 55% or more and less than 100%. Since the number of voids in solid electrolyte layer 10, positive electrode layer 20, or negative electrode layer 30 is reduced by setting the filling rate to 55% or more, a lot of ionic conduction and electron conduction such as lithium (Li) ion are performed, and better charge/discharge characteristics can be obtained. The filling rate is the ratio of the volume occupied by the material excluding the voids between the materials to the total volume in each layer. The detailed manufacturing method of all-solid-state battery 100 will be described later.

The pressed all-solid-state battery 100 is attached with a terminal, for example, and is housed in a case. As the case of all-solid-state battery 100, for example, an aluminum laminated bag, a metal case such as a stainless steel (SUS), iron or aluminum, a resin case, or the like is used.

Hereinafter, solid electrolyte layer 10, positive electrode layer 20, and negative electrode layer 30 of all-solid-state battery 100 in the present exemplary embodiment will be described.

B. Solid Electrolyte Layer

First, solid electrolyte layer 10 will be described. Solid electrolyte layer 10 in the present exemplary embodiment contains solid electrolyte 2 and may further contain a binder.

B-1. Solid Electrolyte

Solid electrolyte 2 in the present exemplary embodiment will be described. Examples of the solid electrolyte material used for solid electrolyte 2 include a sulfide-based solid electrolyte, a halide-based solid electrolyte, and an oxide-based solid electrolyte, which are generally known materials. As the solid electrolyte material, any of a sulfide-based solid electrolyte, a halide-based solid electrolyte, and an oxide-based solid electrolyte may be used. The type of the sulfide-based solid electrolyte in the present exemplary embodiment is not particularly limited. Examples of the sulfide-based solid electrolyte include $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, $Li_2S$—$P_2S_5$, and the like. In particular, from the viewpoint of excellent ionic conductivity of lithium, the sulfide-based solid electrolyte may contain Li, P and S. Since the reactivity with the binder is high and the binding property with the binder is high, the sulfide-based solid electrolyte may contain $P_2S_5$. The above description of "$Li_2S$—$P_2S_5$" means a sulfide-based solid electrolyte using a raw material composition containing $Li_2S$ and $P_2S_5$, and the same applies to other descriptions.

In the present exemplary embodiment, the sulfide-based solid electrolyte is, for example, a sulfide-based glass ceramic containing $Li_2S$ and $P_2S_5$, and the ratio of $Li_2S$ and $P_2S_5$ may be in the range of 70:30 to 80:20 or in the range of 75:25 to 80:20 for $Li_2S:P_2S_5$ in terms of molars. By setting the ratio of $Li_2S$ and $P_2S_5$ in the range, a crystal structure having high ionic conductivity can be obtained while maintaining the Li concentration that affects the battery characteristics. By setting the ratio of $Li_2S$ and $P_2S_5$ in the range, it is easy to secure the amount of $P_2S_5$ for reacting with and binding to the binder.

The type of the oxide-based solid electrolyte in the present exemplary embodiment is not particularly limited. Examples of the oxide-based solid electrolyte include $Li_{0.57}La_{0.29}TiO_3$, $Li_7La_3Zr_2O_{12}$, $Li_7La_3Zr_{2-x}Nb_xO_{12}$, $Li_7La_3Zr_{2-x}Ta_xO_{12}$, $Li_5La_3Ta_2O_{12}$, $Li_3PO_4$, $Li_{1.5}Al_{0.5}Ge_{1.5}P_3O_{12}$, and the like.

Solid electrolyte 2 is composed of, for example, a plurality of particles.

B-2. Binder

The binder in the present exemplary embodiment will be described. The binder is an adhesive that does not have ionic conductivity or electron conductivity and plays a role of adhering the materials in solid electrolyte layer 10 to each other and solid electrolyte layer 10 to another layer. As the binder, a known binder for batteries is used. Further, the binder in the present exemplary embodiment may contain a thermoplastic elastomer having a functional group introduced to improve the adhesion strength. The functional group may be a carbonyl group. From the viewpoint of improving the adhesion strength, the carbonyl group may be maleic anhydride. The oxygen atom of maleic anhydride of the binder reacts with solid electrolyte 2 to bond solid electrolytes 2 to each other via the binder to form a structure in which the binder is disposed between solid electrolytes 2, and as a result, the adhesion strength is improved.

As the thermoplastic elastomer, for example, styrene-butadiene-styrene (SBS), styrene-ethylene-butadiene-styrene (SEBS), and the like are used. This is because styrene-butadiene-styrene (SBS), styrene-ethylene-butadiene-styrene (SEBS), and the like have high adhesion strength and high durability in terms of battery cycle characteristics. As the thermoplastic elastomer, a hydrogenated (hereinafter, hydrogenated) thermoplastic elastomer may be used. By using the hydrogenated thermoplastic elastomer, the reactivity and the binding property are improved, and the solubility in the solvent used when forming the solid electrolyte layer 10 is improved.

The amount of the binder added may be, for example, 0.01% by mass or more and 5% by mass or less, 0.1% by mass or more and 3% by mass or less, or 0.1% by mass or more and 1% by mass or less. When the amount of the binder added is 0.01% by mass or more, bonding via the binder is likely to occur, and sufficient adhesion strength is likely to be obtained. By reducing the amount of the binder added to 5% by mass or less, deterioration of battery characteristics such as charge/discharge characteristics is unlikely to occur, and further, for example, in a low temperature region, even if the physical property values such as the hardness, tensile strength, and tensile elongation of the binder change, the charge/discharge characteristics are unlikely to deteriorate.

C. Positive Electrode Layer

Next, positive electrode layer 20 in the present exemplary embodiment will be described. Positive electrode layer 20 in the present exemplary embodiment contains solid electrolyte 1 and positive electrode active material 3. If necessary, a conductive auxiliary agent such as acetylene black and KETJENBLACK (registered trademark) and a binder for ensuring electron conductivity may be added to positive electrode layer 20, but if the amount added is large, the battery performance is affected, and therefore it is desirable that the amount is small enough not to affect the battery performance. The weight ratio of solid electrolyte 1 and positive electrode active material 3 is, for example, in the range of 50:50 to 5:95 for solid electrolyte 1:positive electrode active material 3 and may be in the range of 30:70 to 10:90. The volume ratio of positive electrode active material 3 to the total volume of positive electrode active material 3 and solid electrolyte 1 is, for example, 60% or more and 80% or less. With this volume ratio, it is easy to secure both the lithium-ion conduction path and the electron conduction path in positive electrode layer 20.

Positive electrode current collector 6 is made of, for example, a metal foil. As the metal foil, for example, a metal foil such as stainless steel (SUS), aluminum, nickel, titanium, or copper is used.

C-1. Solid Electrolyte

Solid electrolyte 1 is freely selected from at least one or more of solid electrolyte materials listed in the above-described section B-1. Solid Electrolyte, and is not particularly limited to the others. For solid electrolyte 1, for example, the same solid electrolyte material as solid electrolyte 2 is used. Different solid electrolyte materials may be used for solid electrolyte 1 and solid electrolyte 2. Solid electrolyte 1 is composed of a plurality of particles.

C-2. Binder

Since a binder is the same as the binder described above, the description thereof will be omitted.

C-3. Positive Electrode Active Material

Positive electrode active material 3 in the present exemplary embodiment will be described. As the material of positive electrode active material 3 in the present exemplary embodiment, for example, a lithium-containing transition metal oxide is used. Examples of the lithium-containing transition metal oxide include $LiCoO_2$, $LiNiO_2$, $LiMn_2O_4$, $LiCoPO_4$, $LiNiPO_4$, $LiFePO_4$, $LiMnPO_4$, compounds obtained by substituting the transition metals of these compounds with one or two different elements, and the like. Examples of the compound obtained by substituting the transition metals of the above compounds with one or two different elements include known materials such as $LiNi_{1/3}Co_{1/3}Mn_{1/3}O_2$, $LiNi_{0.8}Co_{0.15}Al_{0.05}O_2$, $LiNi_{0.5}Mn_{1.5}O_2$, and the like. The material of positive electrode active material 3 may be used alone or in combination of two or more.

Positive electrode active material 3 is composed of, for example, a plurality of particles. The particle size of positive electrode active material 3 is not particularly limited, but is, for example, 1 μm or more and 10 μm or less.

D. Negative Electrode Layer

Next, negative electrode layer 30 in the present exemplary embodiment will be described. Negative electrode layer 30 of the present exemplary embodiment contains solid electrolyte 5 and negative electrode active material 4. If necessary, a conductive auxiliary agent such as acetylene black and KETJENBLACK and a binder for ensuring electron conductivity may be added to negative electrode layer 30, but if the amount added is large, the battery performance is affected, and therefore it is desirable that the amount is small enough not to affect the battery performance. The ratio of solid electrolyte 5 to negative electrode active material 4 is, for example, in the range of 5:95 to 60:40 for solid electrolyte 5:negative electrode active material 4 in terms of weight, and may be in the range of 30:70 to 50:50. The volume ratio of negative electrode active material 4 to the total volume of negative electrode active material 4 and solid electrolyte 1 is, for example, 60% or more and 80% or less. With this volume ratio, it is easy to secure both the lithium-ion conduction path and the electron conduction path in negative electrode layer 30.

Negative electrode current collector 7 is made of, for example, a metal foil. As the metal foil, for example, a metal foil such as SUS, copper, or nickel is used.

D-1. Solid Electrolyte

Solid electrolyte 5 is freely selected from at least one or more of the solid electrolyte materials listed in the above-described section B-1. Solid Electrolyte, and is not particularly limited to the others. For solid electrolyte 5, for example, the same solid electrolyte material as solid electrolyte 1 and solid electrolyte 2 is used. Different solid electrolyte materials may be used for solid electrolyte 5, solid electrolyte 1, and solid electrolyte 2. Further, solid electrolyte 5 is composed of, for example, a plurality of particles.

D-2. Binder

Since a binder is the same as the binder described above, the description thereof will be omitted.

D-3. Negative Electrode Active Material

Negative electrode active material 4 in the present exemplary embodiment will be described. As the material of negative electrode active material 4 in the present exemplary embodiment, for example, metals easily alloyed with lithium such as indium, tin and silicon, carbon materials such as hard carbon and graphite, lithium, or known materials such as $Li_4Ti_5O_{12}$ and $SiO_x$ are used.

The negative electrode active material 4 is composed of, for example, a plurality of particles. The particle size of the negative electrode active material 4 is not particularly limited, but is, for example, 1 μm or more and 15 μm or less.

Manufacturing Method

Figure 2C:
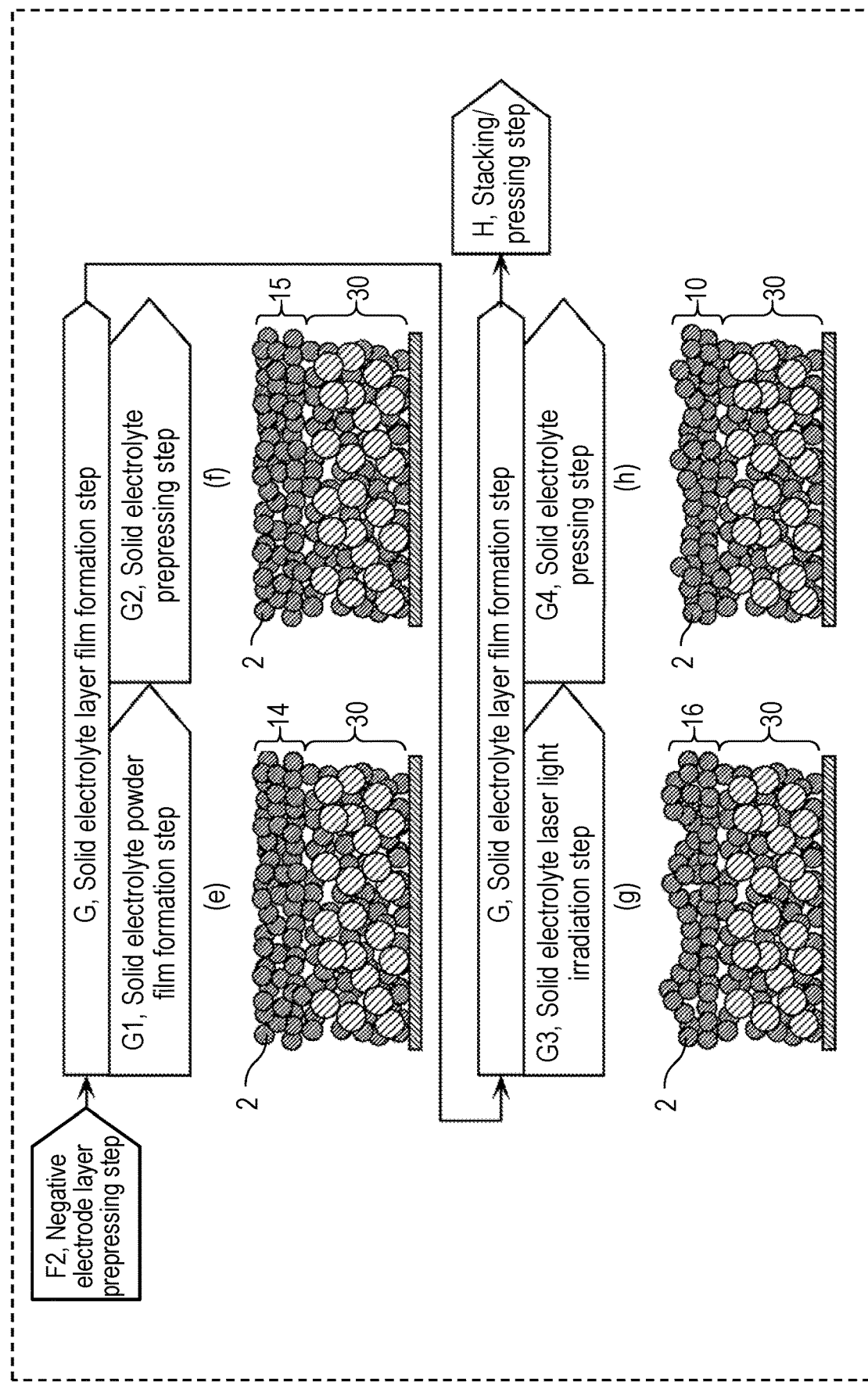
FIG. 2C is a schematic cross-sectional view for describing a solid electrolyte layer film formation step in the exemplary embodiment.
Figure 2D:
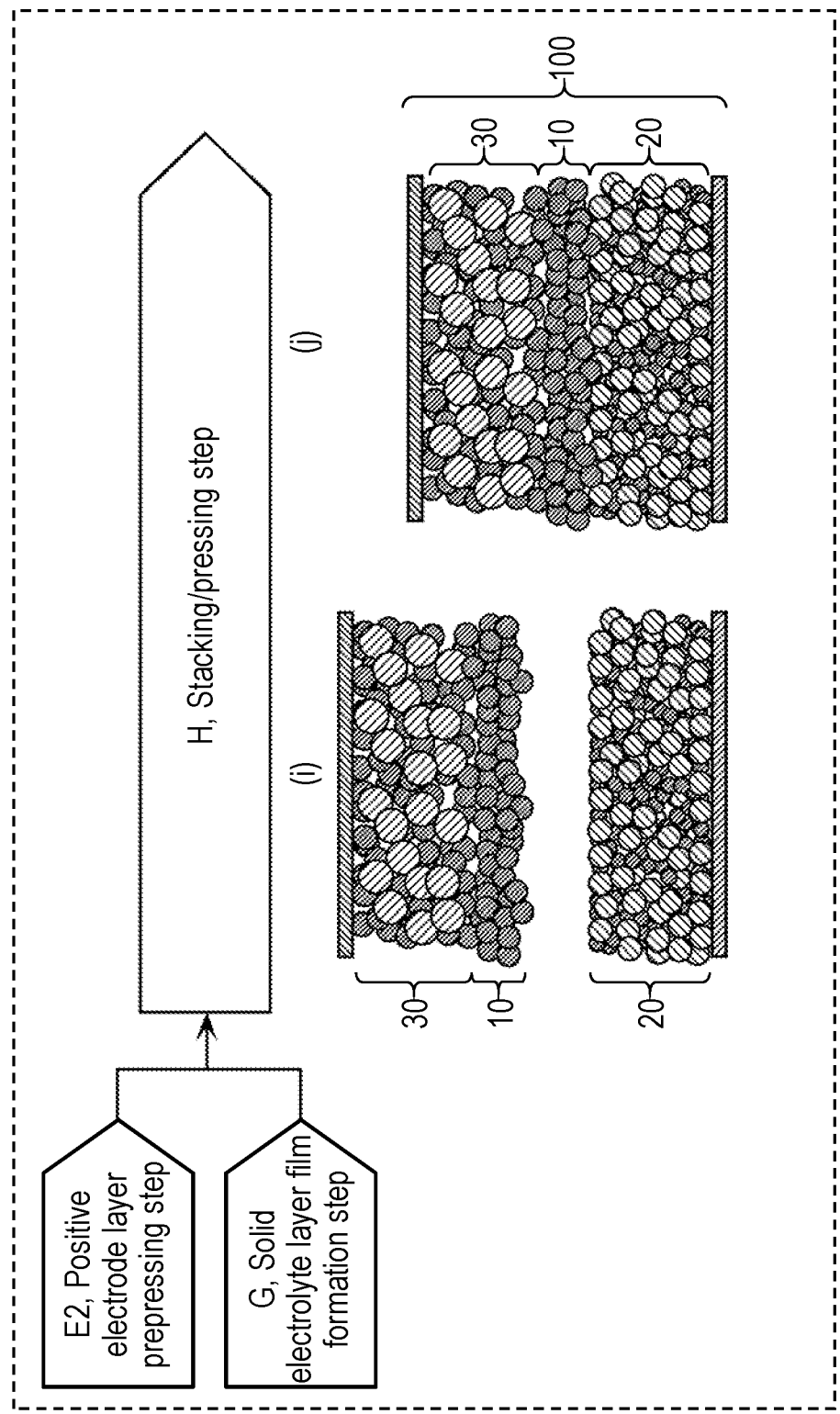
FIG. 2D is a schematic cross-sectional view for describing a stacking step and a pressing step in the exemplary embodiment.

Next, a method for manufacturing all-solid-state battery 100 according to the present exemplary embodiment will be described. Specifically, a method for manufacturing all-solid-state battery 100 including solid electrolyte layer 10, positive electrode layer 20, and negative electrode layer 30 will be described. FIG. 2A is a schematic cross-sectional view for describing a step of forming positive electrode layer 20 in the method for manufacturing all-solid-state battery 100. FIG. 2B is a schematic cross-sectional view for describing a step of forming negative electrode layer 30 in the manufacturing method of all-solid-state battery 100. FIG. 2C is a schematic cross-sectional view for describing the solid electrolyte layer film formation step in the method for manufacturing all-solid-state battery 100. FIG. 2D is a schematic cross-sectional view for describing a stacking step and a pressing step in the method for manufacturing all-solid-state battery 100.

The method for manufacturing all-solid-state battery 100 includes, for example, a positive electrode layer film formation step, a positive electrode layer prepressing step, a negative electrode layer film formation step, a negative electrode layer prepressing step, a solid electrolyte layer film formation step, a stacking step, and a pressing step.

In the positive electrode layer film formation step ((a) of FIG. 2A), positive electrode layer 20 is formed on positive electrode current collector 6. In the positive electrode layer prepressing step ((b) of FIG. 2A), positive electrode layer 20 is pressed and compressed within a range that can be handled in a subsequent step.

In the negative electrode layer film formation step ((c) of FIG. 2B), negative electrode layer 30 is formed on negative electrode current collector 7. In the negative electrode layer prepressing step ((d) of FIG. 2B), negative electrode layer 30 is pressed and compressed within a range that can be handled in the subsequent step.

In the solid electrolyte layer film formation step ((e) to (h) of FIG. 2C), solid electrolyte layer 10 is formed. The solid electrolyte layer film formation step includes, for example, a solid electrolyte powder film formation step, a solid electrolyte prepressing step, a solid electrolyte laser light irradiation step, and a solid electrolyte pressing step. In the solid electrolyte powder film formation step ((e) of FIG. 2C), solid electrolyte 2 composed of a plurality of particles is laid in a film shape to form powder film 14. In the solid electrolyte prepressing step ((f) of FIG. 2C), powder film 14 is pressed with a predetermined pressure to form prepressed powder film 15. In the solid electrolyte laser light irradiation step ((g) in FIG. 2C), by irradiating a plurality of portions of prepressed powder film 15 with laser light, laser light sintered film 16 in which the particles of solid electrolyte 2 are partially sintered to each other is formed. In the solid electrolyte pressing step ((h) of FIG. 2C), laser light sintered film 16 is pressed at a predetermined pressure. Through these steps, solid electrolyte layer 10 is formed. In the solid electrolyte pressing step, heating may be performed as needed during pressing.

In the solid electrolyte layer film formation step, for example, the pressing conditions in the solid electrolyte prepressing step and the laser light irradiation conditions in the solid electrolyte laser light irradiation step are adjusted so that solid electrolyte layer 10 has a repeating structure in which low porosity portion 11 and high porosity portion 12 are repeated in the in-plane direction.

Next, in the stacking step and the pressing step (in (i) and (j) of FIG. 2D), positive electrode layer 20 formed on positive electrode current collector 6, negative electrode layer 30 formed on negative electrode current collector 7 and formed solid electrolyte layer 10 are stacked together so that solid electrolyte layer 10 is disposed between positive electrode layer 20 and negative electrode layer 30 to press from the outside of positive electrode current collector 6 and negative electrode current collector 7.

The method for pressing in each of the above steps is not particularly limited, and is, for example, a flat plate pressing step or a roll pressing step.

Next, each step will be described in detail.

E1. Positive Electrode Layer Film Formation Step

First, as shown in (a) of FIG. 2A, the positive electrode layer film formation step is performed. Examples of the film formation step of positive electrode layer 20 (positive electrode layer film formation step) in the present exemplary embodiment include the following methods.

The positive electrode layer film formation step includes, for example, a mixture adjusting step and a powder stacking step. In the mixture adjusting step, solid electrolyte 1 and positive electrode active material 3 in a powder state which are not slurried is prepared, further, if necessary, a binder and a conductive auxiliary agent (not shown) are prepared as needed, and the prepared materials are mixed while applying an appropriate shear force and pressure to produce a positive electrode mixture in which positive electrode active material 3 and solid electrolyte 1 are evenly dispersed. In the powder stacking step, the produced positive electrode mixture is uniformly stacked on positive electrode current collector 6 to obtain a stacked body. Manufacturing in the form of stacking a positive electrode mixture in a powder state in a film shape has an advantage that a drying step is not required and the manufacturing cost is reduced as compared with a normal wet coating method in which a slurry dispersed in a solvent is coated, and has an effect that the solvent that contributes to the deterioration of the battery performance of all-solid-state battery 100 does not remain in positive electrode layer 20 after the film formation. Positive electrode layer 20 may be formed by forming a slurried positive electrode mixture into a film.

E2. Positive Electrode Layer Prepressing Step

Next, as shown in (b) of FIG. 2A, the positive electrode layer prepressing step is performed. In the positive electrode layer prepressing step, by pressing the stacked body composed of positive electrode current collector 6, solid electrolyte 1, and positive electrode active material 3 obtained in the positive electrode layer film formation step, the positive electrode mixture powder is densified to a level that is easy to be handled in the subsequent step, and positive electrode layer 20 is formed as a powder compressed film.

F1. Negative Electrode Layer Film Formation Step

Next, as shown in (c) of FIG. 2B, the negative electrode layer film formation step is performed. The basic film formation method in the film formation step (negative electrode layer film formation step) of negative electrode layer 30 in the present exemplary embodiment is the same as the above-described section E1. Positive Electrode Layer Film Formation Step except that the material used is changed to the material for negative electrode layer 30.

That is, in the negative electrode layer film formation step, for example, a negative electrode mixture in which solid electrolyte 5 in a powder state which is not slurried, negative electrode active material 4 and, if necessary, a binder and a conductive auxiliary agent (not shown) are mixed is stacked on negative electrode current collector 7. Negative electrode layer 30 may be formed by forming a slurried negative electrode mixture into a film.

F2. Negative Electrode Layer Prepressing Step

Next, as shown in (d) of FIG. 2B, the negative electrode layer prepressing step is performed. In the negative electrode layer prepressing step, for example, by pressing the stacked body composed of negative electrode current collector 7, solid electrolyte 5, and negative electrode active material 4 obtained in the negative electrode layer film formation step, the powder is densified to a level that is easy to be handled in the subsequent step, and negative electrode layer 30 is formed as a powder compressed film. That is, the negative electrode layer prepressing step may be the same method as the method in the above-described section E2. Positive Electrode Layer Prepressing Step.

G. Solid Electrolyte Layer Film Formation Step

In the film formation step of solid electrolyte layer 10 (solid electrolyte layer film formation step), solid electrolyte 2 selected from the materials listed in the above-described section B-1. Solid Electrolyte is used. Then, a mixture of solid electrolyte 2 and a binder if necessary are stacked in a film shape on at least one of positive electrode layer 20 obtained in the positive electrode layer prepressing step and negative electrode layer 30 obtained in the negative electrode layer prepressing step.

In the example shown in FIG. 2C, solid electrolyte 2 is stacked in a film shape on negative electrode layer 30, but the present exemplary embodiment is not limited thereto. In the solid electrolyte layer film formation step, solid electrolyte 2 may be formed directly on at least one of positive electrode layer 20 and negative electrode layer 30 in a film shape. Further, in the solid electrolyte layer film formation step, solid electrolyte layer 10 may be formed on a supporting base material different from positive electrode layer 20 and the negative electrode layer 30, and may be transferred from the supporting base material onto at least one of positive electrode layer 20 and negative electrode layer 30. The supporting base material is, for example, a polyethylene terephthalate (PET) film.

Here, the solid electrolyte layer film formation step will be described in detail.

G1. Solid Electrolyte Powder Film Formation Step

First, as shown in (e) of FIG. 2C, in the solid electrolyte powder film formation step, solid electrolyte 2 composed of a plurality of particles is laid in a film shape to form powder film 14. In the example shown in (e) of FIG. 2C, powder film 14 is formed on negative electrode layer 30. Here, the method of laying solid electrolyte 2 in a film shape is not particularly limited. Examples of the method of laying solid electrolyte 2 in a film shape include a method of supplying powder of solid electrolyte 2 and flattening the power with a squeegee or the like.

G2. Solid Electrolyte Prepressing Step

Next, as shown in (f) of FIG. 2C, in the solid electrolyte prepressing step, powder film 14 formed in the solid electrolyte powder film formation step is pressed with a predetermined pressure to form prepressed powder film 15. The means for pressing in the solid electrolyte prepressing step is not particularly limited. Examples of the pressing means in the solid electrolyte prepressing step include a flat plate pressing step and a roll pressing step. The purpose of the solid electrolyte prepressing step is to release the air in powder film 14 and bring the particles of solid electrolyte 2 constituting powder film 14 into close contact with each other. As a result, in the next solid electrolyte laser light irradiation step, the ease of sintering of solid electrolyte 2 changes depending on the close contact state between the particles of solid electrolyte 2. The pressing conditions in the solid electrolyte prepressing step and the laser light irradiation conditions in the solid electrolyte laser light irradiation step are adjusted according to, for example, the material and particle size of solid electrolyte 2.

G3. Solid Electrolyte Laser Light Irradiation Step

Next, as shown in (g) of FIG. 2C, in the solid electrolyte laser light irradiation step, by irradiating prepressed powder film 15 formed in the solid electrolyte prepressing step with laser light, laser light sintered film 16 in which the particles of solid electrolyte 2 constituting prepressed powder film 15 are partially sintered to each other is formed. By providing a plurality of portions on laser light sintered film 16 that have been irradiated with laser light, in the in-plane direction, a structure is formed in which a portion where sintering between particles is promoted and a portion where sintering between particles is insufficient are repeated. By providing a portion where the energy of the laser light is high and a portion where the energy of the laser light is low, in the in-plane direction, a structure may be formed in which a portion where sintering between particles is promoted and a portion where sintering between particles is insufficient are repeated.

In the solid electrolyte laser light irradiation step, for example, in a portion where the energy of the laser light to be radiated is high, the sintering between particles is promoted, and in a portion where the laser light is not radiated or where the energy of the laser light to be radiated is low, sintering between particles is insufficient. Although the details will be described later, the porosity is low in the portion where the sintering between the particles is promoted, and the porosity is high in the portion where the sintering between the particles is insufficient. This porosity relationship is a relative relationship between the portion where the sintering between the particles is promoted and the portion where the sintering between the particles is insufficient. Since this relationship of porosity is maintained even in finally manufactured all-solid-state battery 100, the portion where the sintering between the particles is promoted becomes the above-mentioned low porosity portion 11, and the portion where the sintering between the particles is insufficient becomes the above-mentioned high porosity portion 12.

G4. Solid Electrolyte Pressing Step

Next, as shown in (h) of FIG. 2C, in the solid electrolyte pressing step, laser light sintered film 16 formed in the solid electrolyte laser light irradiation step is pressed with a predetermined pressure to form solid electrolyte layer 10. The pressing force to be applied in the solid electrolyte pressing step is, for example, a pressure larger than the pressing force in the solid electrolyte prepressing step. Laser light sintered film 16 may be pressed by heating as needed.

Further, the solid electrolyte pressing step can also serve as the pressing step described below, and may be omitted.

H. Stacking Step and Pressing Step

Next, as shown in (i) and (j) of FIG. 2D, the stacking step and the pressing step are performed. In the stacking step, positive electrode layer 20, solid electrolyte layer 10, and negative electrode layer 30 are stacked in this order. In the pressing step, the stacked body stacked in the stacking step is pressed. Specifically, in the stacking step and the pressing step, after stacking positive electrode layer 20 formed on positive electrode current collector 6, negative electrode layer 30 formed on negative electrode current collector 7, and solid electrolyte layer 10 (stacking step), which are obtained by each film formation step and each prepressing step, so that solid electrolyte layer 10 is disposed between positive electrode layer 20 and negative electrode layer 30, pressing is performed from the outside of positive electrode current collector 6 and negative electrode current collector 7 (pressing step) to obtain all-solid-state battery 100. If the solid electrolyte pressing step is omitted, the pressing step also serves as the solid electrolyte pressing step for pressing laser light sintered film 16.

The purpose of the pressing is to increase the densities of positive electrode layer 20, negative electrode layer 30, and solid electrolyte layer 10. By increasing the density, the lithium-ion conductivity and the electron conductivity can be improved in positive electrode layer 20, negative electrode layer 30, and solid electrolyte layer 10, and all-solid-state battery 100 having better battery characteristics can be obtained.

Examination Results

In examining the step for realizing the structure of all-solid-state battery 100 according to the present exemplary embodiment, the following laser light sintered film 16 was formed. As solid electrolyte 2 constituting laser light sintered film 16 below, particles of $Li_{0.57}La_{0.29}TiO_3$ (lithium lanthanum titanium oxide: manufactured by Toho Titanium), which is an oxide-based solid electrolyte, were used.

First, particles of the oxide-based solid electrolyte (average particle size 0.9 µm) were laid on the base material and the film thickness was adjusted with a squeegee to form powder film 14 composed of particles of solid electrolyte 2. Prepressed powder film 15 was formed by prepressing from the upper surface of powder film 14 at 1 kPa or more and 1000 kPa or less, for example, 100 kPa.

Figure 3:
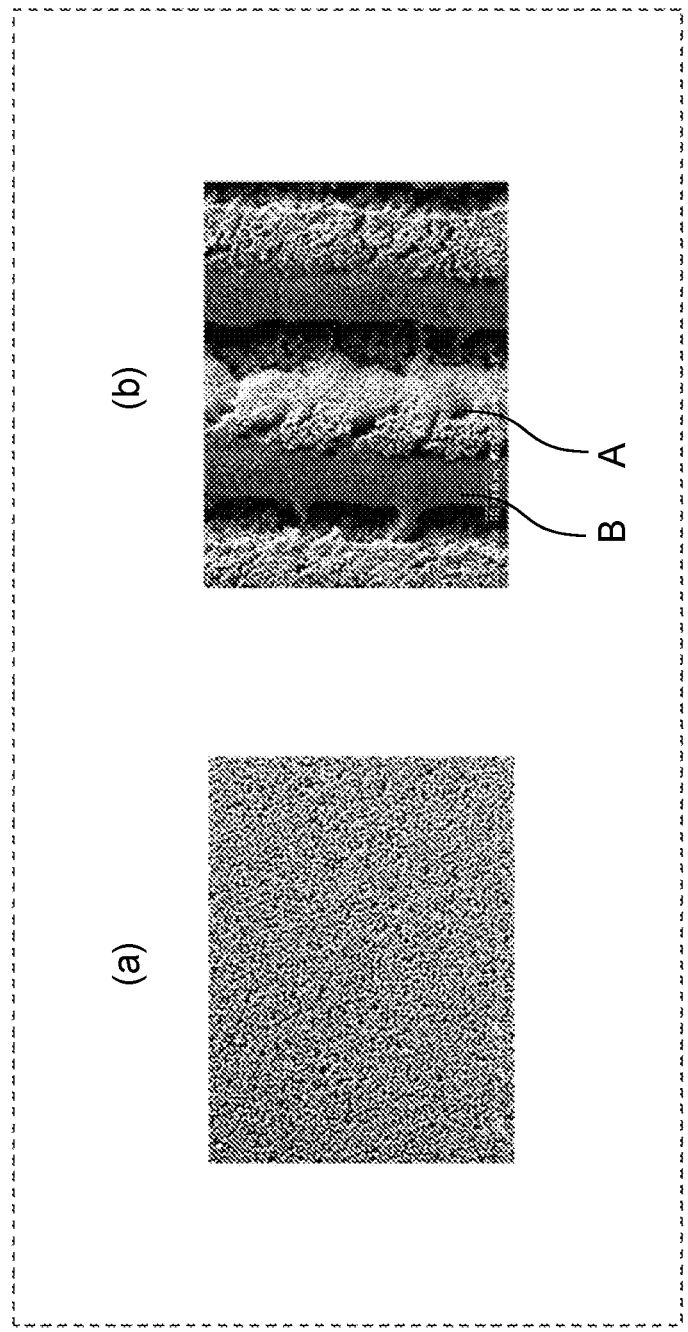
FIG. 3 is a view showing surface SEM observation images of a prepressed powder film and a laser light sintered film in the exemplary embodiment.

Next, the upper surface of prepressed powder film 15 is irradiated with $CO_2$ laser light in a striped manner to form laser light sintered film 16. Surface scanning electron microscope (SEM) observation before and after irradiating prepressed powder film 15 with laser light was performed. FIG. 3 is a view showing surface SEM observation images of prepressed powder film 15 and laser light sintered film 16. (a) of FIG. 3 is an SEM image showing the upper surface of prepressed powder film 15 before laser light irradiation, and (b) of FIG. 3 is an SEM image showing the upper surface of laser light sintered film 16 formed by irradiating prepressed powder film 15 with laser light.

As a result of surface SEM observation, as shown in (a) of FIG. 3, prepressed powder film 15 before laser light irradiation is in a state where particles of the oxide-based solid electrolyte are uniformly laid. On the other hand, as shown in (b) of FIG. 3, by irradiating laser light sintered film 16 with laser light, it is confirmed that portion A in which necking of the particles of solid electrolyte 2 progresses and sintering progresses and portion B in which necking of the particles of the solid electrolyte 2 does not sufficiently progress are alternately formed in the in-plane direction. It was also confirmed that the surface of laser light sintered film 16 has an uneven structure formed by portions A and B. On the surface of laser light sintered film 16, portion A is a convex portion and portion B is a concave portion.

Figure 4:
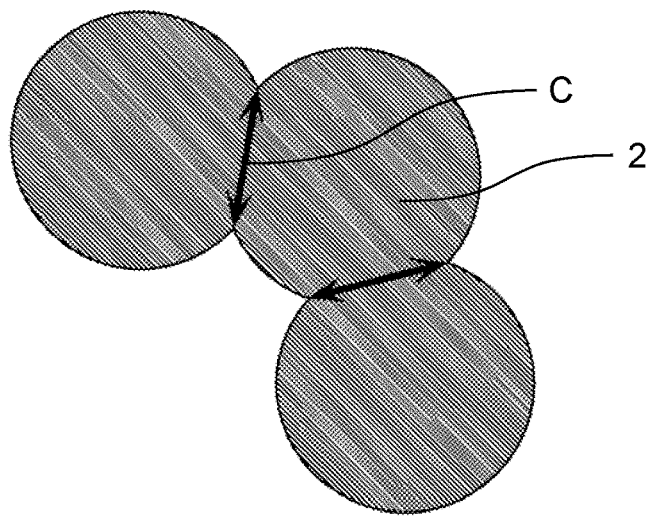
FIG. 4 is a schematic view showing a necking state of particles of a solid electrolyte.

Here, the necking state of the particles of solid electrolyte 2 in portion A and portion B shown in (b) of FIG. 3 will be described with reference to FIG. 4. FIG. 4 is a schematic view showing the necking state of the particles of solid electrolyte 2. As shown in FIG. 4, the necking of the particles of solid electrolyte 2 means that the particles are bonded to each other to form a constricted shape between the bonded particles. The progress of necking means that the bonding between particles progresses, and as a result, the necking width, which is the width of the constricted portion between the particles, becomes large. Therefore, when necking width C shown in FIG. 4 is compared between portion A and portion B shown in (b) of FIG. 3, it was confirmed that necking width C of solid electrolyte 2 in portion A has a relationship of 1.5 times or more necking width C of solid electrolyte 2 in portion B.

Figure 5:
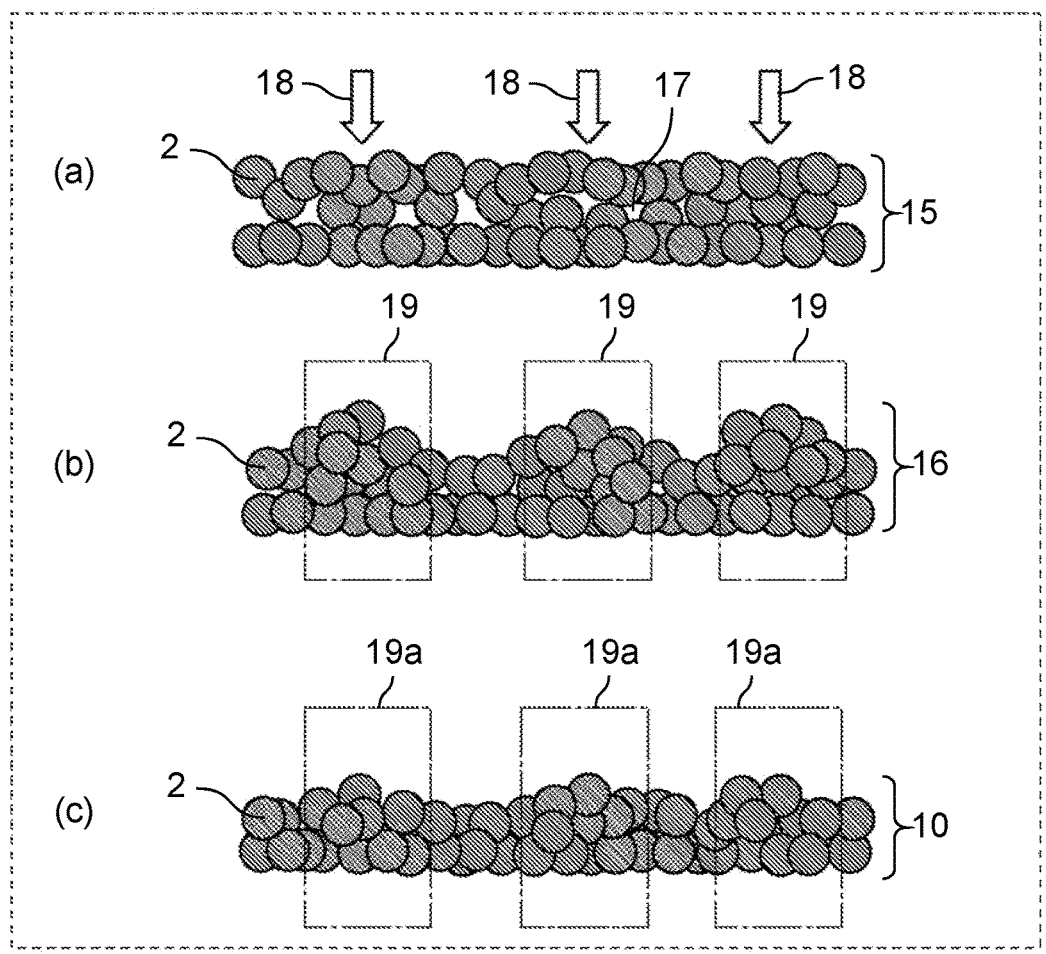
FIG. 5 is a schematic view showing the appearance of the particles of the solid electrolyte in the formation of the solid electrolyte layer in the exemplary embodiment.

Next, the behavior mechanism of the particles of solid electrolyte 2 when irradiated with laser light will be described with reference to FIG. 5. FIG. 5 is a schematic view showing the state of the particles of solid electrolyte 2 in the formation of solid electrolyte layer 10. In FIG. 5, the illustration of the base material is omitted.

(a) of FIG. 5 is a schematic view showing the state of prepressed powder film 15 in which the particles of solid electrolyte 2 are formed in a film shape. As shown in (a) of FIG. 5, in prepressed powder film 15, space 17 exists between the particles of solid electrolyte 2. By partially irradiating prepressed powder film 15 with laser light 18, laser light sintered film 16 shown in (b) of FIG. 5 is formed. In portion 19 where the sintering of solid electrolyte 2 is promoted by the irradiation of laser light 18, in other words, in portion 19 where the energy of the laser light irradiation is strong, necking of the particles of solid electrolyte 2 progresses, and the particles of solid electrolyte 2 in which the necking has progressed are attracted to each other, and at the same time, space 17 described above is reduced. In other words, in the portions other than portion 19 where the energy of the laser light irradiation is strong, that is, the portion where the energy of the laser light irradiation is weaker than the energy of the laser light irradiation irradiated to portion 19, or the portion where the laser light is not radiated, the amount of the particles in solid electrolyte 2 is reduced and the necking does not progress sufficiently, and therefore the amount of reduction in space 17 is small. Therefore, the porosity is low in portion 19, in the portions other than portion 19, the porosity is higher than in portion 19. That is, in laser light sintered film 16, it is possible to intentionally create a portion having a high porosity and a portion having a low porosity. Due to such a difference in the amount of particles of solid electrolyte 2, an uneven shape in which portion 19 is a convex portion is formed on the surface of laser light sintered film 16. It is also possible to form portions having different porosities by pressing with a press plate or the like having an uneven shape. In this case, unlike the method using laser light irradiation, the portion having a high porosity becomes a concave portion.

As shown in (c) of FIG. 5, laser light sintered film 16 is pressed at 1 MPa or more and 1000 MPa or less to form solid electrolyte layer 10. Even in solid electrolyte layer 10, although the absolute value of the porosity and the absolute value of the height of the uneven shape change from laser light sintered film 16, the high-low relationship of the porosity and the uneven shape remain. In particular, since portion 19 is a convex portion, portion 19 is likely to be pressed, and the porosity of portion 19 is likely to be lowered by the pressing. Due to such a step and the behavior of the particles of solid electrolyte 2, the above-mentioned low porosity portion 11 and high porosity portion 12 are formed in solid electrolyte layer 10. That is, portion 19a in (c) of FIG. 5 corresponds to low porosity portion 11. As shown in (c) of FIG. 5, due to low porosity portion 11 and high porosity portion 12, at least one of the surface of solid electrolyte layer 10 on positive electrode layer 20 side and the surface of solid electrolyte layer 10 on negative electrode layer 30 side has an uneven shape. In this uneven shape, the convex portion is formed by low porosity portion 11, and the concave portion is formed by high porosity portion 12. As a result, since the porosity of the convex portion is low, the uneven shape can be easily maintained even when stress is applied during the manufacturing step and during use of all-solid-state battery 100.

The difference in porosity between low porosity portion 11 and high porosity portion 12 and the size of the uneven shape can be adjusted by adjusting the pressing force in prepressing to form prepressed powder film 15, the energy of laser light irradiation to form laser light sintered film 16, the irradiation interval, and the like.

As described above, solid electrolyte layer 10 formed by the above mechanism has a structure partially having low porosity portion 11 and high porosity portion 12, and in all-solid-state battery 100, the stress due to expansion and contraction of the active material due to charge/discharge can be relaxed at high porosity portion 12, and the effect of suppressing the occurrence and propagation of peeling and cracking can be expected. The uneven shape of the surface of solid electrolyte layer 10 can be expected to improve battery performance and reduce peeling by increasing the contact area between the solid electrolyte layer, the positive electrode layer, and/or the negative electrode layer.

The porosity of low porosity portion 11 is, for example, 5% or more and 20% or less. The porosity of high porosity portion 12 is, for example, 25% or more and 45% or less. The difference between the porosity of high porosity portion 12 and the porosity of low porosity portion 11, that is, the difference in porosity expressed by the formula of "porosity of high porosity portion 12"—"porosity of low porosity portion 11" is, for example, 5% or more and 40% or less. When the difference in porosity is 40% or less, the ionic conductivity of solid electrolyte layer 10 is unlikely to decrease, and the battery performance of all-solid-state battery 100 is unlikely to be impaired. When the difference in porosity is 5% or more, the effect of suppressing the occurrence and propagation of peeling and cracking is enhanced. Porosity is measured, for example, by observing the cross section of solid electrolyte layer 10. For example, in the cross section of observed solid electrolyte layer 10, the porosity is defined as the percentage of the area of the void not occupied by solid electrolyte 2 per fixed area.

The necking width of the particles of solid electrolyte 2 in low porosity portion 11 is, for example, 1.5 times or more and 10 times or less the necking width of the particles of solid electrolyte 2 in high porosity portion 12. When this ratio is 1.5 times or more, the effect of suppressing the occurrence and propagation of peeling and cracking is enhanced. When this ratio is 10 times or less, the ionic conductivity of high porosity portion 12 is unlikely to decrease, and the battery performance of all-solid-state battery 100 is unlikely to be impaired.

Next, the disposition of low porosity portion 11 and high porosity portion 12 in solid electrolyte layer 10 will be described. In the repeating structure of solid electrolyte layer 10, the position and shape in which low porosity portion 11 and high porosity portion 12 are disposed can be freely adjusted by, for example, adjusting the position of irradiating the laser light.

For example, low porosity portion 11 is disposed in a line shape or a dot shape. By disposing low porosity portion 11 in such a shape, it is possible to simplify, for example, the device for irradiating the laser light used for forming low porosity portion 11.

In the repeating structure, the ratio of low porosity portion 11 and high porosity portion 12 differs between the outer peripheral portion and the central portion of solid electrolyte layer 10 in the top view. In this way, it is possible to adjust the balance between stress relaxation due to expansion and contraction of the active material and ionic conductivity of solid electrolyte layer 10 according to the characteristics and shape of all-solid-state battery 100. The ratio is, for example, an area ratio, the central portion is, for example, a region inside the position where the distance between the center and the outer periphery of solid electrolyte layer 10 is equal in the top view, and the outer peripheral portion is a region outside the central portion.

Here, an example of the disposition of low porosity portion 11 and high porosity portion 12 in the top view of solid electrolyte layer 10 will be described with reference to FIG. 6.

Figure 6:
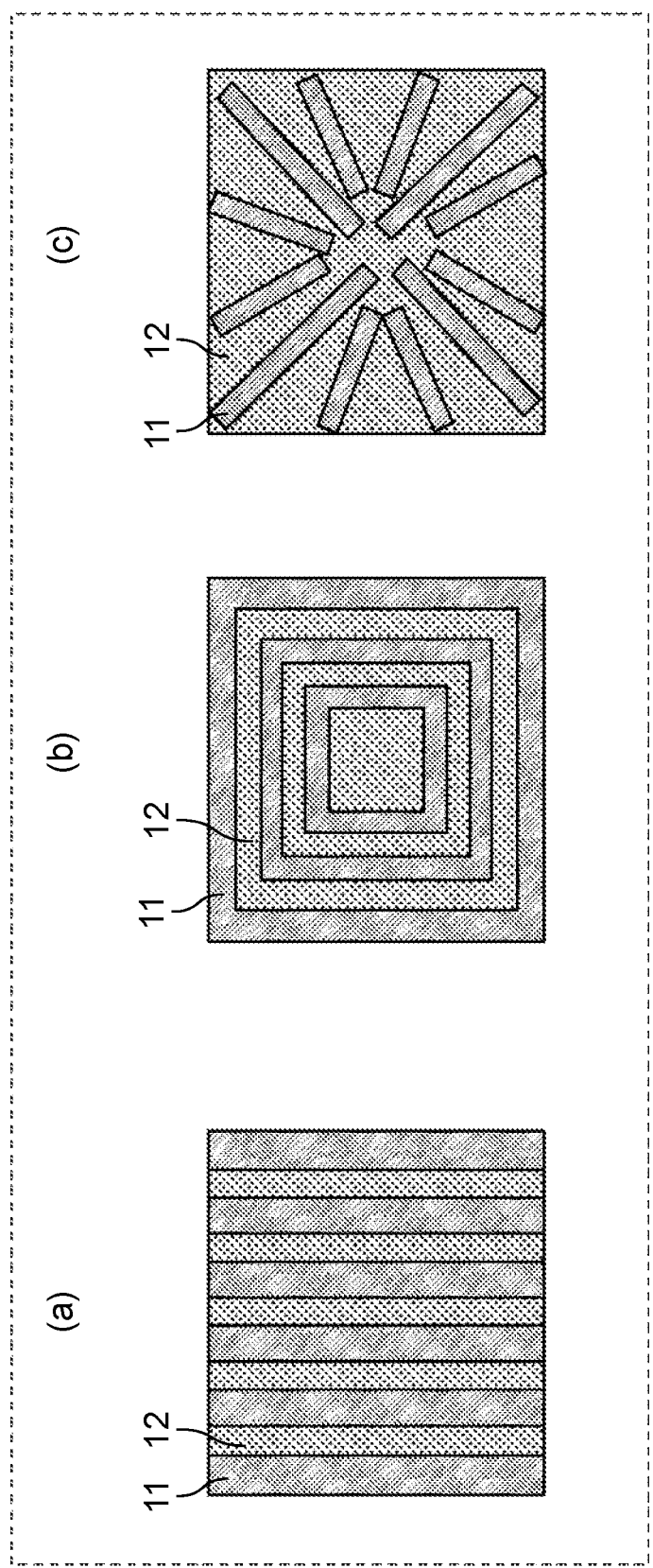
FIG. 6 is a schematic view showing an example of disposition of a low porosity portion and a high porosity portion in a top view of the solid electrolyte layer in the exemplary embodiment.

FIG. 6 is a schematic view showing an example of the disposition of low porosity portion 11 and high porosity portion 12 in the top view of solid electrolyte layer 10. FIG.

6 is a view of solid electrolyte layer 10 of all-solid-state battery 100 as viewed from above, that is, along the stacking direction.

For example, as shown in (a) of FIG. 6, low porosity portion 11 and high porosity portion 12 are disposed in a stripe shape by scanning and irradiating with laser light in a stripe shape in a solid electrolyte layer laser light irradiation step. The repeating structure shown in (a) of FIG. 6 is a structure in which line-shaped low porosity portion 11 and high porosity portion 12 are repeated along the in-plane direction of solid electrolyte layer 10. With such a disposition, the device for irradiating the laser light used for forming low porosity portion 11 can be simplified, and low porosity portion 11 and high porosity portion 12 can be easily formed.

For example, as shown in (b) of FIG. 6, in the top view, low porosity portion 11 and high porosity portion 12 are disposed in a ring shape except for high porosity portion 12 located at the center by scanning and irradiating with laser light in a ring shape in the solid electrolyte layer laser light irradiation step. In the example shown in (b) of FIG. 6, the ring shape is a rectangular ring shape, but is not particularly limited, and may be a similar shape or an annular shape of the outer peripheral shape of solid electrolyte layer 10. With such a disposition, in the solid electrolyte pressing step after radiating laser light, the material constituting solid electrolyte layer 10 is less likely to flow from the central portion to the outer periphery in the top view, and the uniformity of the pressed pressure and the film thickness between the central portion and the outer peripheral portion is less likely to be impaired.

For example, as shown in (c) of FIG. 6, by scanning and irradiating with laser light radially from the central portion toward the outer periphery in the solid electrolyte layer laser light irradiation step, in top view, low porosity portions 11 are disposed in a radial shape and high porosity portions 12 are disposed so as to fill the space between low porosity portions 11 in a radial shape. With such a disposition, in the top view, the region that is not irradiated with the laser light per unit area increases from the center to the outer periphery, in other words, the ratio of high porosity portion 12 to low porosity portion 11 is increasing. Since the stress due to expansion and contraction of the active material in all-solid-state battery 100 increases as the active material is closer to the outer peripheral portion, it becomes easier to relax the stress due to expansion and contraction by increasing the proportion of high porosity portion 12 toward the outer periphery. That is, it is effective for increasing the size of all-solid-state battery 100.

Further, as in the case of forming the disposition shown in (a) to (c) of FIG. 6, not limited to the case of continuously scanning and irradiating with laser light in the shape of a straight line, by scanning and irradiating with laser light in the shape of a broken line or a dot, the effect of relaxing the strain caused by the local stress difference between low porosity portion 11 and high porosity portion 12 can be expected.

Next, the disposition of low porosity portion 11 and high porosity portion 12 in the thickness direction of solid electrolyte layer 10 will be described. By forming solid electrolyte layer 10 on positive electrode layer 20 and negative electrode layer 30, respectively by the method described in the above-described section G. Solid Electrolyte Layer Film Formation Step and by the method of repeating the step described in the above-described section G. Solid Electrolyte Layer Film Formation Step, it is possible to form solid electrolyte layer 10 composed of a plurality of layers. Therefore, it is possible to change the porosity along the thickness direction of solid electrolyte layer 10. For example, solid electrolyte layer 10 may include a layer having a repeating structure and a layer having no repeating structure. In solid electrolyte layer 10, the layer having no repeating structure is disposed so as to be in contact with at least one of positive electrode layer 20 and negative electrode layer 30, for example. An example of the disposition of low porosity portion 11 and high porosity portion 12 in the cross-sectional view of solid electrolyte layer 10 will be described with reference to FIG. 7.

FIG. 7 is a schematic view showing an example of the disposition of low porosity portion 11 and high porosity portion 12 in a cross-sectional view of solid electrolyte layer 10. FIG. 7 is a view showing a cross section of solid electrolyte layer 10 located between positive electrode layer 20 and negative electrode layer 30 cut in the thickness direction.

For example, as shown in (a) of FIG. 7, a layer composed of low porosity portion 11 may be disposed at a position in solid electrolyte layer 10 at the interface between solid electrolyte layer 10 and positive electrode layer 20 and the interface between solid electrolyte layer 10 and negative electrode layer 30. Solid electrolyte layer 10 shown in (a) of FIG. 7 has low porosity portion 11 that is aligned with high porosity portion 12 along the thickness direction and is in contact with positive electrode layer 20 and negative electrode layer 30. Low porosity portion 11 aligned with high porosity portion 12 along the thickness direction may be a portion having a lower porosity than high porosity portion 12, and the porosity may be different from low porosity portion 11 in the repeating structure, that is, low porosity portion 11 which is aligned with high porosity portion 12 along the in-plane direction. Solid electrolyte layer 10 may not include one of a layer composed of low porosity portion 11 in contact with positive electrode layer 20 and a layer composed of low porosity portion 11 in contact with negative electrode layer 30.

With such a disposition, the ionic conductivity of solid electrolyte layer 10 in the vicinity of positive electrode layer 20 and negative electrode layer 30 is enhanced, and even when solid electrolyte 2 having low ionic conductivity is used, local current concentration at the interface between solid electrolyte layer 10 and positive electrode layer 20 and the interface between solid electrolyte layer 10 and negative electrode layer 30 is less likely to occur.

For example, as shown in (b) of FIG. 7, a layer composed of high porosity portion 12 may be disposed at a position in solid electrolyte layer 10 at the interface between solid electrolyte layer 10 and positive electrode layer 20 and the interface between solid electrolyte layer 10 and negative electrode layer 30. Solid electrolyte layer 10 shown in (b) of FIG. 7 has high porosity portion 12 that is aligned with low porosity portion 11 along the thickness direction and is in contact with positive electrode layer 20 and negative electrode layer 30. High porosity portion 12 aligned with low porosity portion 11 along the thickness direction may be a portion having a higher porosity than low porosity portion 11, and the porosity may be different from high porosity portion 12 in the repeating structure, that is, high porosity portion 12 aligned with low porosity portion 11 along the in-plane direction. Solid electrolyte layer 10 may not include one of a layer composed of high porosity portion 12 in contact with positive electrode layer 20 and a layer composed of high porosity portion 12 in contact with negative electrode layer 30.

With such a disposition, it becomes easier to relax the stress due to expansion and contraction of the active material in the vicinity of the interface between solid electrolyte layer 10 and positive electrode layer 20 and the interface between solid electrolyte layer 10 and negative electrode layer 30. In such a disposition, deterioration of battery performance can be suppressed by using a material having high ionic conductivity as solid electrolyte 2 constituting solid electrolyte layer 10.

For example, as shown in (c) of FIG. 7, solid electrolyte layer 10 may be composed of a plurality of layers each having a repeating structure, and the adjacent layers may be disposed so that the positions of low porosity portion 11 and high porosity portion 12 are displaced from each other. By disposing in this way, the variation in ionic conductivity due to the partial difference in the density of solid electrolyte 2 in the in-plane direction of solid electrolyte layer 10 is suppressed, and the uniformity between the in-plane directions is secured. The dispositions shown in (a) to (c) of FIG. 7 may be combined as appropriate.

By utilizing the concept of these dispositions, by setting the ionic conductivity in the region at the end of all-solid-state battery 100 (for example, when viewed along the stacking direction, within a range of 5 mm from the end face) lower than in the other regions, unexpected battery reaction via the ends of positive electrode layer 20 and negative electrode layer 30 can be suppressed, and the effect of suppressing short circuit can be expected.

Other Exemplary Embodiments

Although the all-solid-state battery according to the present disclosure has been described above based on the exemplary embodiments, the present disclosure is not limited to these exemplary embodiments. As long as the gist of the present disclosure is not deviated, various modifications that can be conceived by those skilled in the art are applied to the exemplary embodiments, and other exemplary embodiments constructed by combining some components of the exemplary embodiment are also included in the scope of the present disclosure.

For example, in the above exemplary embodiment, an example in which the ion conducted in all-solid-state battery 100 is a lithium ion has been described, but the present exemplary embodiment is not limited thereto. The ion conducted in all-solid-state battery 100 may be an ion other than lithium ion such as sodium ion, magnesium ion, potassium ion, calcium ion or copper ion.

In the above exemplary embodiment, the repeating structure is formed by irradiating with laser light, but the present exemplary embodiment is not limited thereto. The repeating structure may be formed by using a plurality of types of the material of solid electrolyte 2, or adjusting the conditions for pressing powder film 14.

According to the all-solid-state battery and the like according to the present disclosure, it is possible to suppress the occurrence of peeling and cracking, and the propagation of the occurred peeling and cracking.

The all-solid-state battery according to the present disclosure is expected to be applied to various batteries such as a power source for portable electronic devices and an in-vehicle battery.

What is claimed is:

1. An all-solid-state battery comprising:
a structure in which
a positive electrode current collector,
a positive electrode layer containing a positive electrode active material and a first solid electrolyte,
a solid electrolyte layer containing a third solid electrolyte,
a negative electrode layer containing a negative electrode active material and a second solid electrolyte, and
a negative electrode current collector are stacked in this order, wherein
the solid electrolyte layer has a repeating structure in which a low porosity portion and a high porosity portion having a higher porosity than a porosity of the low porosity portion are repeated in an in-plane direction.

2. The all-solid-state battery according to claim 1, wherein
a difference between the porosity of the high porosity portion and the porosity of the low porosity portion is 5% or more and 40% or less.

3. The all-solid-state battery according to claim 1, wherein
the low porosity portion is disposed in a line shape or a dot shape in a top view.

4. The all-solid-state battery according to claim 1, wherein
in the repeating structure, a ratio of the low porosity portion and the high porosity portion differs between an outer peripheral portion and a central portion of the solid electrolyte layer in a top view.

5. The all-solid-state battery according to claim 1, wherein
at least one of a surface of the solid electrolyte layer on a positive electrode layer side and a surface of the solid electrolyte layer on a negative electrode layer side has an uneven shape.

6. The all-solid-state battery according to claim 5, wherein
in the uneven shape, a convex portion is formed by the low porosity portion.

7. The all-solid-state battery according to claim 1, wherein
the solid electrolyte layer has a portion having a higher porosity than the porosity of the low porosity portion, which is aligned with the low porosity portion along a thickness direction and is in contact with the positive electrode layer or the negative electrode layer.

8. The all-solid-state battery according to claim 1, wherein
The solid electrolyte layer has a portion having a lower porosity than the porosity of the high porosity portion, which is aligned with the high porosity portion along a thickness direction and is in contact with the positive electrode layer or the negative electrode layer.

9. The all-solid-state battery according to claim 1, wherein
the repeating structure is a structure in which line-shaped the low porosity portion and the high porosity portion are repeated along the in-plane direction of the solid electrolyte layer.

10. The all-solid-state battery according to claim 1, wherein
the repeating structure is a structure in which, when viewed from above, the high porosity portion is disposed in the center of the plane of the solid electrolyte layer, and the low porosity portions and the high porosity portions are alternately disposed around the central high porosity portion in a rectangular ring shape or an annular shape.

11. The all-solid-state battery according to claim 1, wherein the repeating structure is a structure in which, when viewed from above, the low porosity portions are arranged radially from the central portion of the surface of the solid electrolyte layer, and the high porosity portions are arranged so as to fill spaces between the radially arranged low porosity portions.

* * * * *